United States Patent
Sjoberg et al.

(10) Patent No.: US 6,893,713 B2
(45) Date of Patent: May 17, 2005

(54) PROCESS FOR THE MANUFACTURING OF DECORATIVE LAMINATE

(75) Inventors: Ake Sjoberg, Lund (SE); Ann-Charlott Johansson, Lund (SE)

(73) Assignee: Pergo (Europe) AB, Trelleborg (SE)

( * ) Notice: Subject to any disclaimer, the term of this patent is extended or adjusted under 35 U.S.C. 154(b) by 0 days.

(21) Appl. No.: 10/450,153

(22) PCT Filed: Dec. 7, 2001

(86) PCT No.: PCT/SE01/02704
§ 371 (c)(1),
(2), (4) Date: Jul. 7, 2003

(87) PCT Pub. No.: WO02/47906
PCT Pub. Date: Jun. 20, 2002

(65) Prior Publication Data
US 2004/0058156 A1 Mar. 25, 2004

(30) Foreign Application Priority Data
Dec. 11, 2000 (SE) .............................. 0004562

(51) Int. Cl.⁷ .................. B32B 25/06; B32B 25/08; B32B 27/42; B32B 29/00; B32B 31/20
(52) U.S. Cl. ............ 428/329; 428/331; 428/339; 428/523; 428/524; 428/535; 428/537.1; 428/537.5; 428/913.3; 156/307.4; 156/307.7
(58) Field of Search .............. 428/537.1, 524, 428/526, 329, 331, 339, 411.1, 535, 537.5, 542.8, 913.3; 156/307.4, 307.7

(56) References Cited

U.S. PATENT DOCUMENTS

| 5,186,996 | A | | 2/1993 | Alts |
| 5,441,786 | A | | 8/1995 | Manassa |
| 5,827,462 | A | * | 10/1998 | Brandt et al. ............... 264/179 |
| 5,842,686 | A | | 12/1998 | Hansen et al. |

FOREIGN PATENT DOCUMENTS

| DE | 2729778 | | 1/1979 |
| EP | 0329154 | | 8/1989 |
| EP | 0590693 | | 4/1994 |
| GB | 1455461 | | 11/1975 |
| JP | 1-310058 | * | 12/1989 |
| WO | 9321402 | | 10/1993 |

OTHER PUBLICATIONS

JPO abstract of JP 1–310058, Dec. 1989.*
Derwent abstract of JP 1–310058, Dec. 1989.*
Search Report dated Mar. 11, 2002.

* cited by examiner

Primary Examiner—Ramsey Zacharia
(74) Attorney, Agent, or Firm—Stevens, Davis, Miller & Mosher, L.L.P.

(57) ABSTRACT

A process for the manufacturing of a decorative laminate, which laminate comprises an upper decorative and abrasion resistant thermosetting laminate layer and a carrying core. The upper side of the core is provided with the abrasion resistant thermosetting laminate with a dampening foil of an elastomer arranged between the upper side of the core and the abrasion resistant thermosetting laminate, which elastomer and which thermosetting laminate are joined with each other and with the core by means of pressing.

19 Claims, No Drawings

PROCESS FOR THE MANUFACTURING OF DECORATIVE LAMINATE

This application is a §371 Application of International Application No. PCT/SE01/02704, filed on Dec. 7, 2001, claiming the priority of Swedish Application No. 0004562-5, filed Dec. 11, 2000, the entire disclosures of which are incorporated herein by reference in their entireties.

The present invention relates to a process for the manufacturing of a decorative thermosetting laminate with a damping layer intended to decrease the sound-level.

Products coated with thermosetting laminate are common nowadays. They are foremost used where the demands on abrasion resistance are great, but also where resistance towards different chemicals and moisture are demanded. As example of such products can be mentioned floors, floor beadings, work tops, desk tops and wall panels.

The thermosetting laminate most often consists of a number of base sheets with decor sheet arranged closest to the surface. The decor sheet can be provided with a desired decor or pattern. Such laminates are very hard in order to withstand the wear they are exposed to. This will unfortunately lead to a high noise level when hard objects are retarded suddenly by the laminate surface, such as hard heels towards a laminate surface.

It is desirable to be able to muffle the sound level in locales with a floor surface of laminate, specially in locales where shoes normally are used.

It has, through the present invention, been made possible to meet the above mentioned desires and a thermosetting laminate with a lower noise level in respect of for example step noise, has been achieved. Accordingly, the invention relates to a process for the manufacturing of a decorative laminate, which laminate comprises an upper decorative and abrasion resistant thermosetting laminate layer and a carrying core. The invention is characterised in that the upper side of the core is provided with the abrasion resistant thermosetting laminate with a dampening foil of an elastomer arranged between the upper side of the core and the abrasion resistant thermosetting laminate. The elastomer and the thermosetting laminate are joined with each other and with the core by means of pressing.

The thermosetting laminate is preferably constituted by one or more decor papers impregnated with melamine-formaldehyde resin and one or more overlay sheets impregnated with melamine formaldehyde resin arranged on top of the decor papers. The thermosetting laminate may further possibly constitute one or more conventional resin impregnated underlay papers, arranged under the decor paper or decor papers, which underlay papers preferably contains phenol-formaldehyde resin. The different papers are laminated together under increased pressure and increased temperature. At least one of the sheets impregnated with thermosetting resin, preferably the outermost, is provided with hard particles of for example silicon oxide, aluminium oxide and/or silicon carbide with an average size of 1–100 $\mu$m, preferably around 5–60 $\mu$m. The thermosetting laminate suitably has a thickness in the range 0.3 mm–1.2 mm, preferably 0.3 mm–0.9 mm and a density in the range 1250–1500 kg/m$^3$.

The carrying core is suitably constituted by a particle board or a fibre board. It is however possible to manufacture the carrying core from a polymer based sheet comprising organic and/or inorganic particles.

The dampening foil is preferably constituted of a thermoplastic elastomer. The dampening foil suitably has elasticity compression coefficient in the range 0.5–2.7 Mpa, preferably 0.8–2.0 Mpa as measured according to ISO 3386-1 with supplement from ISO 7214. The dampening foil preferably has a thickness in the range 0.1–0.7 mm, preferably 0.1–0.5 mm. The dampening foil is suitably constituted of an expanded physically cross-linked polyolefin with closed cells and suitably has a density in the range 150–400 kg/m$^3$, preferably 180–330 kg/m$^3$.

The dampening foil and the thermosetting laminate is suitably joined with the carrying core by means of glue and pressure. The glue can hereby be constituted by a water-soluble standard glue or a so-called melt-glue. In the latter case the dampening foil, the carrying core and the thermosetting laminate joined via heat and pressure. It is also possible to let the dampening foil itself work as a melt-glue layer. The dampening foil is then suitably non-expanded and will then have a density in the range 400–900 kg/m$^3$.

What is claimed is:

1. A process for the manufacturing of a decorative laminate floor surface, which laminate flooring surface comprises an upper decorative and abrasion resistant thermosetting laminate layer and a carrying core, the carrying core comprising at least one selected from the group consisting of particle board, fibre board, and polymer, wherein a sound dampening foil of a non-expanded thermoplastic elastomer is arranged between the upper side of the core and the abrasion resistant thermosetting laminate, which elastomer and which thermosetting laminate are joined with each other and with the core by means of pressing wherein the dampening foil has a thickness in the range 0.1–0.5 mm and at least one property selected from the group consisting of:

elasticity coefficient in the range 0.5–2.7 MPa; and density in the range of 400–900 kg/m$^3$.

2. A process according to claim 1, wherein the thermosetting laminate is constituted by one or more decor papers impregnated with melamine-formaldehyde resin and one or more overlay sheets impregnated with melamine formaldehyde resin arranged on top of the decor papers and optionally one or more resin impregnated underlay papers, arranged under the decor paper or decor papers, which papers are laminated together under increased pressure and increased temperature.

3. A process according to claim 2, wherein at least one of the sheets impregnated with thermosetting resin is provided with hard particles.

4. A process according to claim 3, wherein the hard particles are selected from the group consisting of silicon oxide, aluminium oxide and silicon carbide.

5. A process according to claim 3, wherein the hard particles have an average size of between about 5–60 $\mu$m.

6. A process according to claim 3, wherein the hard particles have an average size of between about 1 and 100 $\mu$m.

7. A process according to claim 2 wherein the thermosetting laminate has a thickness in the range 0.3 mm–1.2 mm.

8. A process according to claim 2 wherein the thermosetting laminate has a density in the range 1250–1500 kg/m$^3$.

9. A process according to claim 2, wherein the thermosetting laminate is constituted of one or more resin impregnated underlay papers, arranged under the decor paper or decor papers.

10. A process according to claim 2, wherein the thermosetting laminate has a thickness in the range 0.3 mm–0.9 mm.

11. A process according to claim 2, wherein the one or more underlay papers comprise a phenol-formaldehyde resin.

12. A process according to claim 1, wherein the polymer carrying core is constituted by a polymer based sheet comprising at least one of organic particles and inorganic particles.

13. A process according to claim 1, wherein the dampening foil has elasticity compression coefficient in the range 0.5–2.7 MPa.

14. A process according to claim 1, wherein the dampening foil and the thermosetting laminate are joined with the carrying core by means of glue and pressure.

15. A process according to claim 1, wherein the dampening foil and the thermosetting laminate are joined with the carrying core by means of melt-glue, heat and pressure.

16. A process according to claim 1, wherein the dampening foil has elasticity compression coefficient in the range 0.8–2.0 MPa.

17. A process according to claim 1, wherein the thermoplastic is a polyolefin.

18. A decorative laminate flooring surface comprising:
   an upper layer, formed from a thermosetting laminate and a decorative layer;
   a carrying core formed from particle board, fibre board, and polymer, and
   a sound dampening foil, formed from a non-expanded thermoplastic elastomer and positioned between the upper layer and the core, the dampening foil has a thickness in the range 0.1–0.5 mm and at least one property selected from the group consisting of:
   elasticity coefficient in the range 0.5–2.7 MPa; and
   density in the range of 400–900 kg/m$^3$.

19. The decorative laminate flooring surface of claim 18, wherein the upper layer, dampening foil and carrying core have been joined by pressing.

* * * * *